US011052472B2

(12) United States Patent
Noshita et al.

(10) Patent No.: US 11,052,472 B2
(45) Date of Patent: Jul. 6, 2021

(54) CUTTING INSERT AND INDEXABLE EDGE ROTARY CUTTING TOOL

(71) Applicant: Mitsubishi Hitachi Tool Engineering, Ltd., Tokyo (JP)

(72) Inventors: Masashi Noshita, Narita (JP); Hayato Takahashi, Narita (JP)

(73) Assignee: MOLDINO TOOL ENGINEERING, LTD., Tokyo (JP)

( * ) Notice: Subject to any disclaimer, the term of this patent is extended or adjusted under 35 U.S.C. 154(b) by 132 days.

(21) Appl. No.: 16/339,521

(22) PCT Filed: Dec. 25, 2017

(86) PCT No.: PCT/JP2017/046350
§ 371 (c)(1),
(2) Date: Apr. 4, 2019

(87) PCT Pub. No.: WO2018/123930
PCT Pub. Date: Jul. 5, 2018

(65) Prior Publication Data
US 2019/0240745 A1     Aug. 8, 2019

(30) Foreign Application Priority Data
Dec. 27, 2016 (JP) .............................. JP2016-252899

(51) Int. Cl.
*B23C 5/06* (2006.01)
*B23C 5/22* (2006.01)
*B23C 5/20* (2006.01)

(52) U.S. Cl.
CPC ............... *B23C 5/06* (2013.01); *B23C 5/207* (2013.01); *B23C 5/2243* (2013.01);
(Continued)

(58) Field of Classification Search
CPC ..... B23C 2200/125; B23C 2/06; B23C 2/207; B23C 2/2247
See application file for complete search history.

(56) References Cited

U.S. PATENT DOCUMENTS 5,454,670 A    10/1995  Noda et al.
7,838,520 B2 * 11/2010  Delorme .............. C07D 251/52
                                                           514/231.5
(Continued)

FOREIGN PATENT DOCUMENTS

CN    102046313 A    5/2011
CN    106029071 A    10/2016
(Continued)

OTHER PUBLICATIONS

Office Action dated Dec. 30, 2019, issued for Chinese Patent Application No. 201780063811.8 and English translation thereof.
(Continued)

Primary Examiner — Nicole N Ramos
(74) Attorney, Agent, or Firm — Locke Lord LLP

(57) ABSTRACT

A cutting insert includes a rake face configuring one of polygonal surfaces, a seating surface configuring the other one of the polygonal surfaces, and a side surface connecting the rake face and the seating surface to each other. The cutting insert has a cutting edge portion including a main cutting edge located in a side portion of the rake face, a subsidiary cutting edge connected to the main cutting edge, and a corner cutting edge connected to the subsidiary cutting edge and located in a corner portion of the rake face. The side surface includes a flank face and a connection surface which are adjacent to each other in a thickness direction via
(Continued)

a boundary line. The connection surface is located on the seating surface side, and is located outside than an extension line of the flank face.

21 Claims, 11 Drawing Sheets

(52) U.S. Cl.
CPC .... *B23C 5/2247* (2013.01); *B23C 2200/0461* (2013.01); *B23C 2200/125* (2013.01); *B23C 2210/503* (2013.01)

(56) References Cited

U.S. PATENT DOCUMENTS

| | | | | |
|---|---|---|---|---|
| 8,157,489 | B2* | 4/2012 | Wolf | B23B 27/141 |
| | | | | 408/223 |
| 8,277,151 | B2* | 10/2012 | Wandeback | B23C 5/06 |
| | | | | 407/42 |
| 8,485,765 | B2* | 7/2013 | Kruszynski | B23B 27/141 |
| | | | | 408/223 |
| 9,266,175 | B2* | 2/2016 | Jaeger | B23C 5/109 |
| 9,475,134 | B2* | 10/2016 | Satran | B23C 5/207 |
| 2008/0304924 | A1* | 12/2008 | Engstrom | B23C 5/202 |
| | | | | 407/114 |
| 2010/0183386 | A1* | 7/2010 | Heinloth | B23B 5/18 |
| | | | | 407/113 |
| 2010/0272526 | A1* | 10/2010 | Dufour | B23B 51/048 |
| | | | | 407/114 |
| 2013/0115022 | A1* | 5/2013 | Ishi | B23C 5/109 |
| | | | | 409/132 |
| 2013/0156515 | A1 | 6/2013 | Satran et al. | |
| 2015/0174664 | A1 | 6/2015 | Nam et al. | |
| 2016/0158854 | A1 | 6/2016 | Ishi | |
| 2017/0225243 | A1 | 8/2017 | Matsumura et al. | |

FOREIGN PATENT DOCUMENTS

| | | |
|---|---|---|
| DE | 20320089 U1 | 3/2004 |
| EP | 2409801 A1 | 1/2012 |
| EP | 2546012 A1 | 1/2013 |
| EP | 2596889 A1 | 5/2013 |
| EP | 2623240 A1 | 8/2013 |
| JP | 50-077982 A | 6/1975 |
| JP | 62-188318 U | 11/1987 |
| JP | 04-067919 U | 6/1992 |
| JP | 06-015517 A | 1/1994 |
| JP | 2009-291925 A | 12/2009 |
| JP | 2015-100901 A | 6/2015 |
| KR | 10-2013-0057406 A | 5/2013 |
| KR | 10-2016-0019952 A | 2/2016 |
| TW | 438637 B | 6/2001 |
| WO | 2011/111197 A1 | 9/2011 |
| WO | 2012/043822 A1 | 4/2012 |
| WO | 2015/147220 A1 | 10/2015 |

OTHER PUBLICATIONS

International Search Report dated Feb. 20, 2018, issued for PCT/JP2017/046350 and English translation thereof.
Notice of Allowance dated Sep. 5, 2019, issued for the Korean patent application No. 10-2019-7012005 and English translation thereof.
Supplementary European Search Report dated Jul. 14, 2020, issued for European Patent Application No. 17887915.1.
Office Action dated Jul. 1, 2019, issued for the Korean patent application No. 10-2019-7012005 and English translation thereof.

* cited by examiner

CUTTING INSERT AND INDEXABLE EDGE ROTARY CUTTING TOOL

TECHNICAL FIELD

The present invention relates to a cutting insert and an indexable edge rotary cutting tool.

Priority is claimed on Japanese Patent Application No. 2016-252899, filed on Dec. 27, 2016, the content of which is incorporated herein by reference.

BACKGROUND ART

In the related art, a cutting tool having a detachable cutting insert is known. This cutting tool has been progressively developed in various ways in order to improve strength and ensure restriction stability of a cutting insert by sufficiently securing an area of a restriction portion (for example, refer to Patent Document 1).

CITATION LIST

Patent Literature

[Patent Document 1] Japanese Unexamined Patent Application, First Publication No. 2015-100901

SUMMARY OF INVENTION

Technical Problem

Even in a case where a strong force is applied to a cutting insert, cutting work can be stably carried out by improving restriction stability of the cutting insert. In addition, damage to the cutting insert can be limited by improving strength of the cutting insert.

The present invention is made in view of the above-described circumstances, and an object thereof is to provide a cutting insert in which restriction stability of the cutting insert mounted on a rotating tool main body is improved by securing an area of a restriction portion and strength is improved, and an indexable edge rotary cutting tool including the cutting insert.

Solution to Problem

According to an aspect of the present invention, there is provided a positive-type cutting insert mounted on a tool main body rotating around a rotation axis, and having a polygonal plate shape which is rotationally symmetric with respect to a center line extending in a thickness direction. The cutting insert includes a rake face configuring one of a pair of polygonal surfaces, a seating surface configuring the other one of the pair of polygonal surfaces, and a side surface connecting the rake face and the seating surface to each other. An intersection ridgeline between the rake face and the side surface has a cutting edge portion including a main cutting edge located in a side portion of the rake face, a subsidiary cutting edge connected to the main cutting edge, and a corner cutting edge connected to the subsidiary cutting edge and located in a corner portion of the rake face. The side surface includes a flank face and a connection surface which are adjacent to each other in the thickness direction via a boundary line. The flank face is located closer to the rake face side than the boundary line. The connection surface is located on the seating surface side, and is located outside than an extension line of the flank face. In a cross section in a normal direction of each ridgeline of the main cutting edge, the subsidiary cutting edge, and the corner cutting edge, a passage point of the cutting edge portion is set as a point P, a perpendicular line extending from the point P toward an extension line of the seating surface is set as a line segment H, an intersection point between the line segment H and the extension line of the seating surface is set as a point R, an intersection point between an extension line along the flank face and the seating surface is set as a point Q, a passage point of an intersection ridgeline between the connection surface and the seating surface is set as a point Q', a passage point of the boundary line is set as a point M, a perpendicular line extending from the point M toward the line segment H is set as a line segment N, an intersection point between the line segment N and the line segment H is set as a point M', the point Q' is located closer to the point Q side than a point S located at a distance of ⅓ of a line segment QR from the point R, and the point M' is located closer to the point R side than a point T located at a distance of ⅔ of the line segment H from the point R. Here, a portion which is connected to the seating surface and the main cutting edge of the flank face function as restriction portions in contact with the tool main body.

According to the above-described configuration, a portion of the flank face located on the rake face side on the side surface is caused to function as the restriction portion, and the connection surface is formed on the seating surface side. The connection surface is located outside than the extension line of the flank face. That is, the connection surface is formed on the side surface so as to overlay the flank face on the seating surface side. In this manner, rigidity of the cutting insert can be improved, and damage to the cutting insert can be limited. As a result of providing the connection surface, an area of the seating surface increases, and restriction stability of the cutting insert with respect to the tool main body can be improved. In addition, since the connection surface is provided, when viewed in the thickness direction, a distance (that is, a protrusion amount) from an edge portion of the seating surface to the cutting edge portion can be shortened. As a result, strength of the cutting edge portion can be improved. On the side surface corresponding to the main cutting edge, the flank face functions as a portion of the restriction portion. Therefore, it is preferable to improve the restriction stability of the cutting insert with respect to the tool main body by sufficiently widening the flank face. In addition, the restriction stability of the cutting insert with respect to the tool main body can be improved by sufficiently widening the flank face and sufficiently securing the area of the restriction portion.

In addition, the cutting insert may be configured as follows. The boundary line includes a first section extending along the main cutting edge, a second section extending along the subsidiary cutting edge, and a third section extending along the corner cutting edge. The second section is located closer to the rake face side than the first section. The third section is located closer to the seating surface side than the first section.

According to the above-described configuration, a position of the boundary line between the flank face and the connection surface in the thickness direction varies in a portion along the main cutting edge (first section), a portion along the subsidiary cutting edge (second section), and a portion along the corner cutting edge (third section). On the side surface corresponding to the subsidiary cutting edge, the flank face does not configure the restriction portion. Therefore, even in a case where the strength of the subsidiary cutting edge is improved by locating the boundary line on the rake face side so as to form the wide connection surface, it is possible to reduce influence on a restriction force of the cutting insert. In addition, on the side surface corresponding to the corner cutting edge, the flank face does not configure the restriction portion. In the portion along the corner cutting edge, it is preferable to locate the boundary line close to the seating surface. The corner cutting edge passes through a rotation trajectory farthest from the rotation axis of the tool main body. Accordingly, in a case where an insert is mounted on the tool main body by setting the rake angle of the insert in the radial direction as the negative angle, it is necessary to sufficiently secure the flank face in the thickness direction. In this manner, in each region of the side surface corresponding to each cutting edge, areas of a flank face and a connection surface can be arranged in a well-balanced manner.

In addition, the cutting insert may be configured as follows. The point Q' is located closer to the point Q side than a point S' located at a distance of 2/3 of the line segment QR from the point R.

According to the above-described configuration, it is possible to sufficiently secure a clearance from the cutting edge portion.

In addition, the cutting insert may be configured as follows. In a sectional view where a ridgeline of the subsidiary cutting edge of the insert and a normal line thereof intersect each other, the point M' is located closer to the point P side than 3/10 of the line segment H from the point R, and the point M' is located closer to the point R side than the point T.

According to the above-described configuration, the point M' is set to fall within the above-described range. Accordingly, the sufficiently wide flank face can be secured for the subsidiary cutting edge, and the strength of the subsidiary cutting edge can be improved.

In addition, the cutting insert may be configured as follows. In a cross section where a ridgeline of the corner cutting edge of the insert and a normal line of a tangential line thereof intersect each other, the point M' is located closer to the point R side than 2/10 of the line segment H.

According to the above-described configuration, the sufficiently wide flank face can be secured for the corner cutting edge passing through the outermost side of the rotation trajectory, and the strength of the corner cutting edge can be improved by securing the connection surface as wide as possible.

In addition, according to another aspect of the present invention, there is provided an indexable edge rotary cutting tool including the cutting insert and the tool main body having the cutting insert detachably mounted thereon and rotating around the rotation axis. The tool main body has an insert mounting seat in contact with the restriction portion of the cutting insert.

According to the above-described configuration, it is possible to provide the indexable edge rotary cutting tool which can achieve the above-described advantageous effect.

In addition, the indexable edge rotary cutting tool may be configured as follows. The cutting insert is mounted on the tool main body so that a rake angle of the cutting edge portion in a radial direction is a negative angle.

According to the above-described configuration, even in a case where the rake angle of the cutting edge portion in the radial direction is the negative angle, it is possible to provide the indexable edge rotary cutting tool which sufficiently secures a clearance of the cutting edge portion.

In addition, the indexable edge rotary cutting tool may be configured as follows. The insert mounting seat includes a mounting seat bottom surface facing in a rotation direction of the tool main, and a mounting seat wall surface extending from the mounting seat bottom surface in the rotation direction of the tool body. The mounting seat bottom surface comes in contact with the seating surface. The mounting seat wall surface comes in contact with the flank face. The cutting insert is mounted on the tool main body with the mounting seat bottom surface and the mounting seat wall surface pressed against the seating surface and the flank face.

Advantageous Effects of Invention

According to the present invention, it is possible to provide the cutting insert in which the restriction stability of the cutting insert mounted on the tool main body is improved and the strength is improved, and the indexable edge rotary cutting tool including the cutting insert.

DESCRIPTION OF EMBODIMENTS

Figure 1:
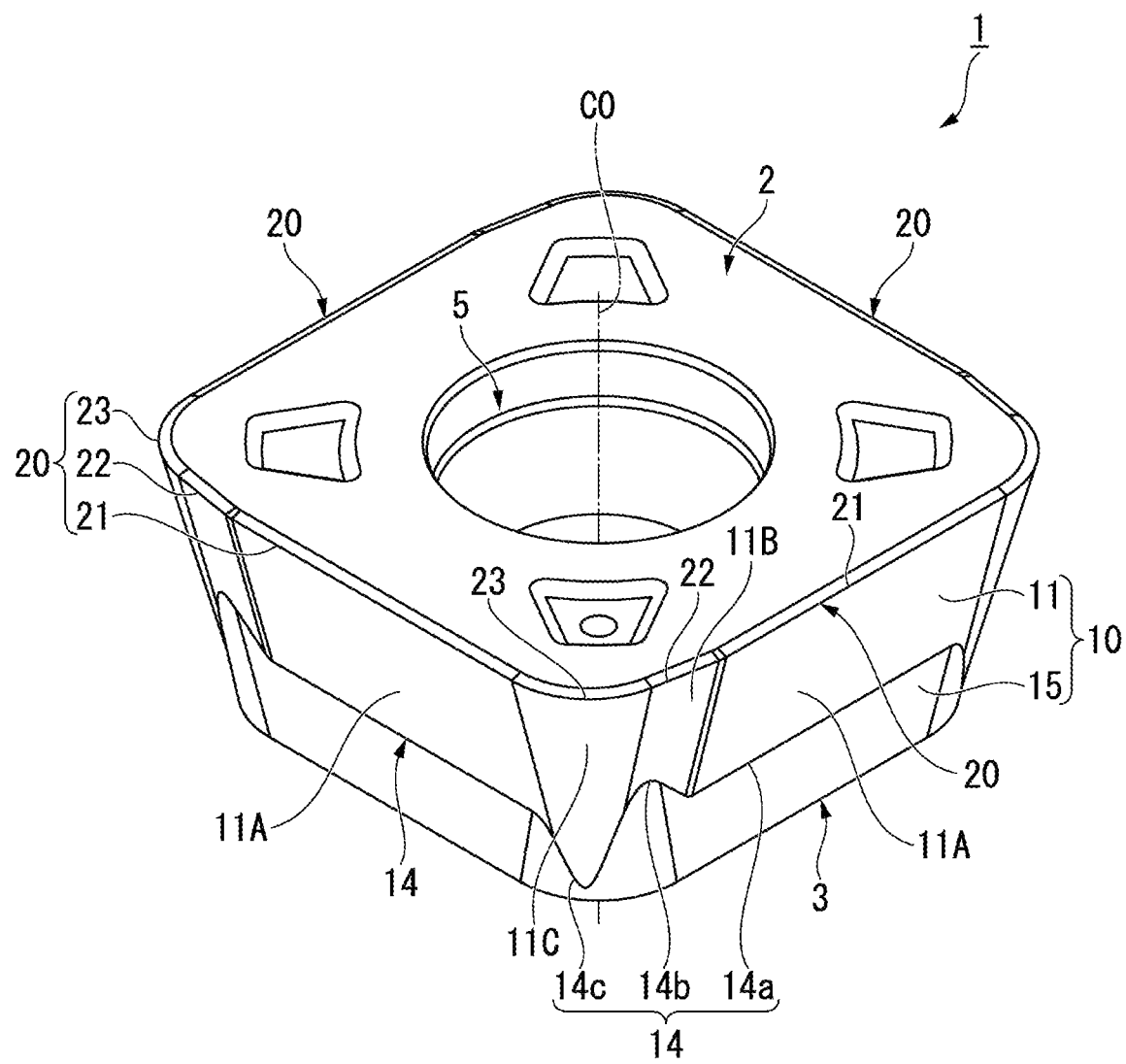
FIG. 1 is a perspective view of a cutting insert according to an embodiment.

Hereinafter, an embodiment to which the present invention is applied will be described in detail with reference to the drawings. In the drawings used for the following description, in order to facilitate understanding of characteristic portions, the characteristic portions may be shown by appropriately omitting portions which are not characteristic, in some cases.

Figure 2:
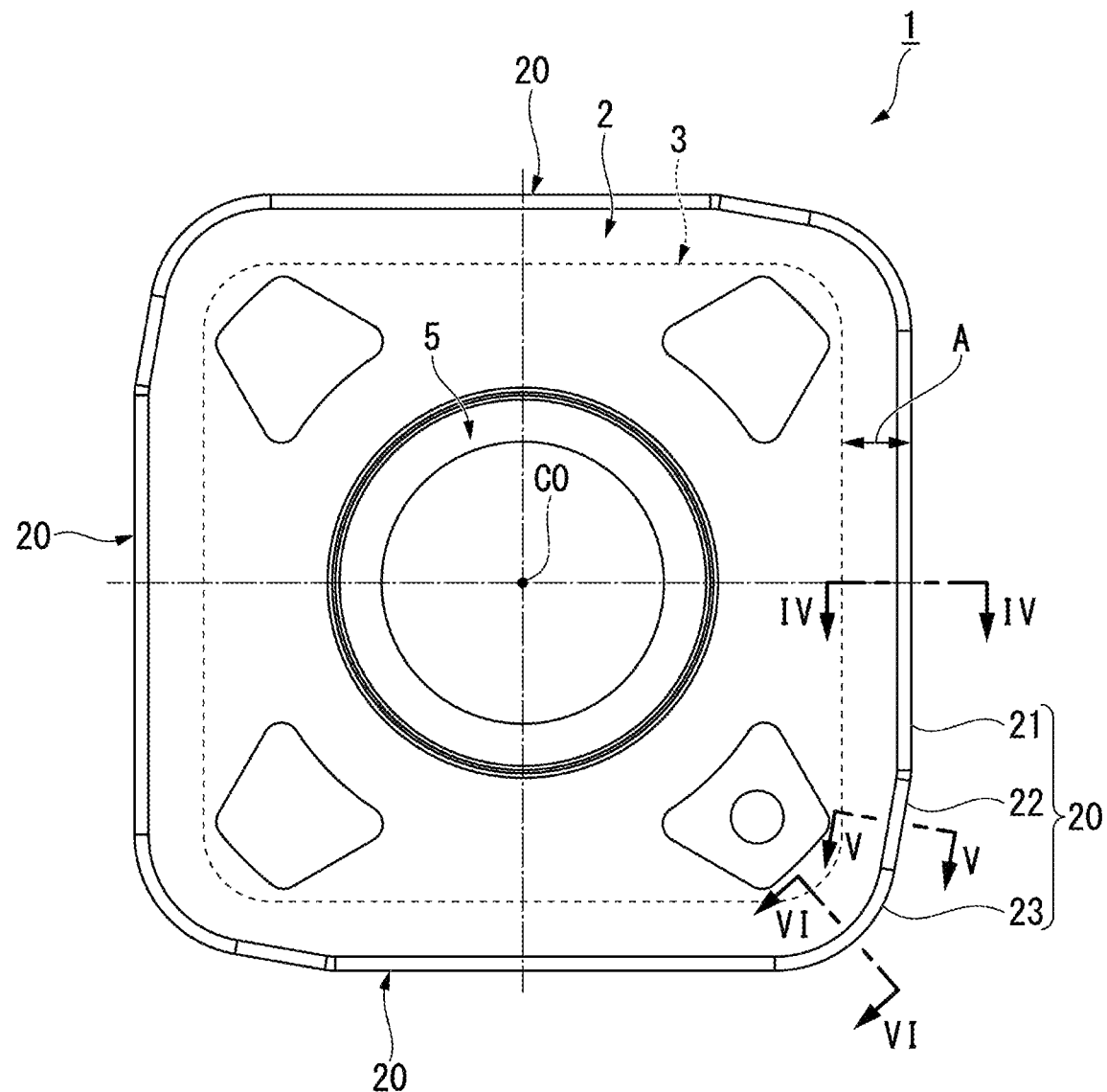
FIG. 2 is a plan view of the cutting insert according to the embodiment.

FIG. 1 is a perspective view showing an embodiment of a cutting insert (hereinafter, simply referred to as an insert) 1. FIG. 2 is a plan view showing a configuration of a rake face 2 of the insert 1 shown in FIG. 1.

Figure 3:
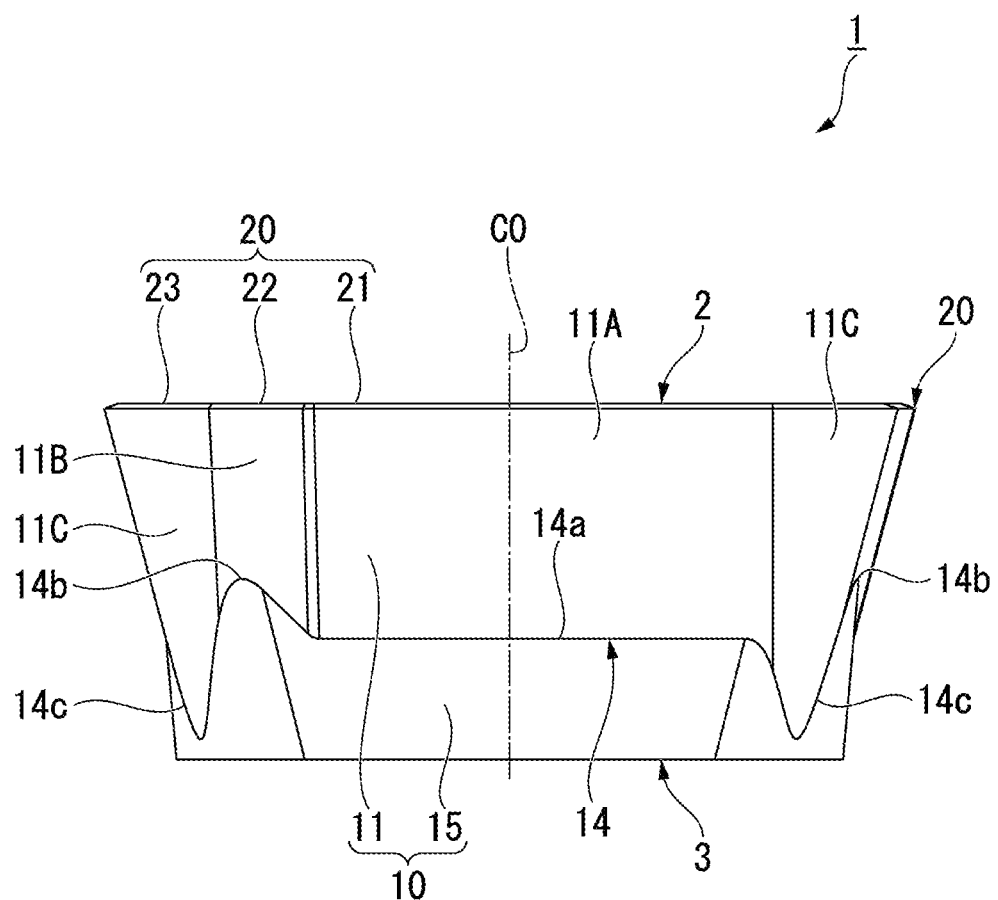
FIG. 3 is a side view of the cutting insert according to the embodiment.

FIG. 3 is a side view showing a configuration of a side surface 10 of the insert 1.

The insert 1 has a polygonal plate shape (square plate shape in the present embodiment) rotationally symmetric with respect to a center line CO extending in a thickness direction. In the following description, a direction along the center line CO may be simply referred to as the thickness direction, in some cases. In addition, a direction perpendicular to the center line CO may be simply referred to as a radial direction, in some cases. Similarly, an axially circumferential direction around the center line CO may be simply referred to as a circumferential direction, in some cases.

The insert 1 includes a rake face 2 configuring one of a pair of polygonal surfaces, a seating surface 3 configuring the other one of the pair of polygonal surfaces, and a side surface 10 connecting the rake face 2 and the seating surface 3 to each other. As shown in FIG. 2, the rake face 2 and the seating surface 3 are formed in a substantially square shape. The seating surface 3 is accommodated inside a region projected in the thickness direction of the rake face 2.

Figure 7:
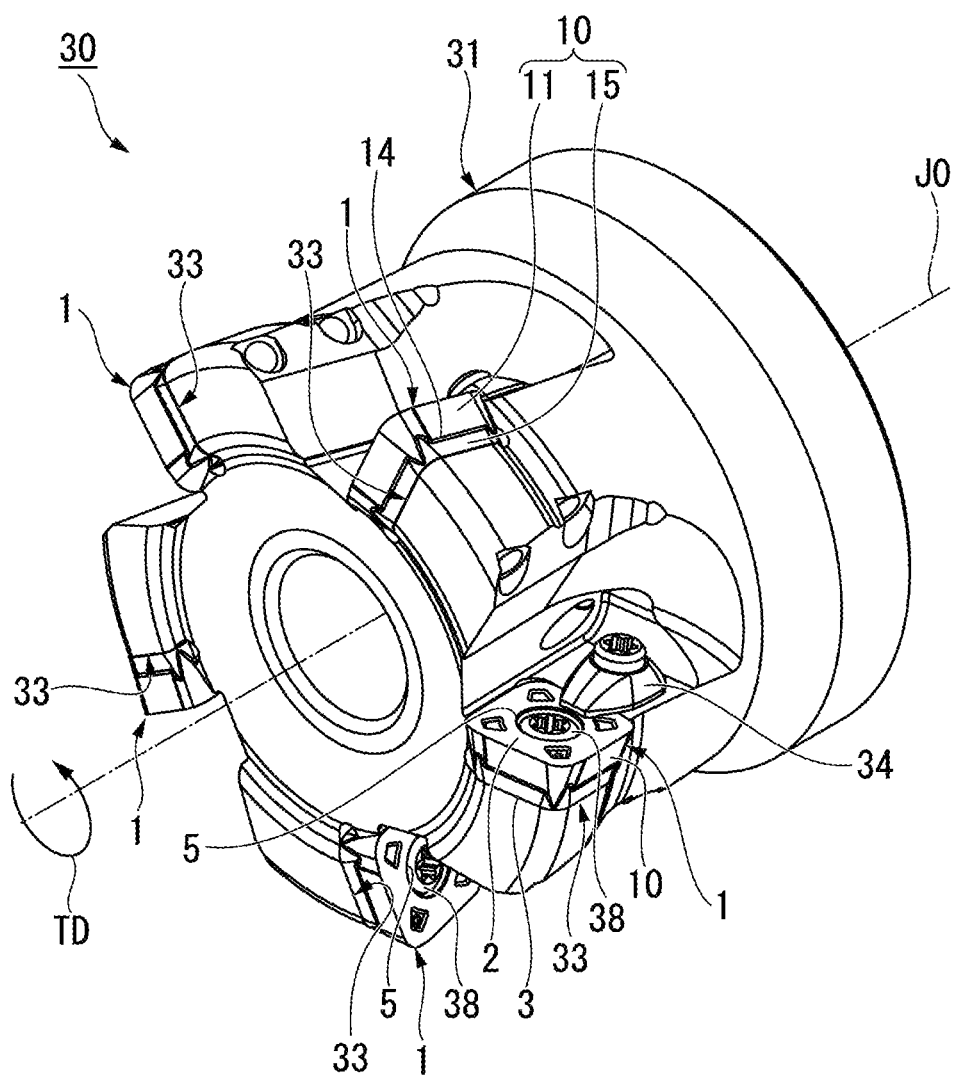
FIG. 7 is a perspective view of an indexable edge rotary cutting tool according to an embodiment.

As shown in FIG. 7 which will be described later, the insert 1 is detachably mounted on a tip portion of a tool main body 31 by using a clamp screw (fixing member) 38. A mounting hole 5 into which the clamp screw 38 is inserted penetrates the rake face 2 and the seating surface 3. The mounting hole 5 extends along the center line CO.

An intersection ridgeline between the rake face 2 and the side surface 10 has a cutting edge portion 20. The cutting edge portion 20 includes a main cutting edge 21, a subsidiary cutting edge 22 connected to the main cutting edge 21, and a corner cutting edge 23 connected to the subsidiary cutting edge 22. The main cutting edge 21, the subsidiary cutting edge 22, and the corner cutting edge 23 are arranged in this order in a rightward (clockwise) direction in a plan view of the rake face 2. In the insert 1 according to the present embodiment, four cutting edge portions 20 configured to include the main cutting edge 21, the subsidiary cutting edge 22, and the corner cutting edge 23 are disposed at each interval of 90°. The four cutting edge portions 20 are arranged rotationally symmetrically around the center line CO. A pair of the cutting edge portions 20 adjacent to each other along the circumferential direction continuously extends.

The main cutting edge 21 is located in a side portion of the rake face 2, and linearly extends in a plan view of the rake face 2. The main cutting edge 21 configures a major portion of the cutting edge portion 20. In a state where the insert 1 is mounted on the tool main body 31 (refer to FIG. 7), the main cutting edge 21 is oriented to a rotation direction TD of the tool main body 31, and faces a cutting workpiece.

The corner cutting edge 23 is located in a corner portion of the rake face 2. The corner cutting edge 23 has an arc shape. On the other hand, the main cutting edge 21 and the subsidiary cutting edge 22 linearly extend. Therefore, a boundary between the corner cutting edge 23, the main cutting edge 21, and the subsidiary cutting edge 22 is determined by a boundary between a linear-shaped portion and an arc-shaped portion in the cutting edge portion 20.

The subsidiary cutting edge 22 is located between the main cutting edge 21 and the corner cutting edge 23. The subsidiary cutting edge 22 linearly extends. The subsidiary cutting edge 22 extends while being inclined to the center line CO side with respect to an extending direction of the main cutting edge 21. Therefore, the boundary between the main cutting edge 21 and the subsidiary cutting edge 22 has a shape protruding slightly outward.

The cutting insert according to the present invention is a positive-type cutting insert. Accordingly, the flank face 11 and the connection surface 15 which configure the side surface 10 are inclined surfaces inclined along a substantial clearance angle. A boundary line 14 is located between the flank face 11 and the connection surface 15. That is, the side surface 10 is partitioned into the flank face 11 and the connection surface 15 by the boundary line 14.

The flank face 11 and the connection surface 15 are adjacent to each other in the thickness direction. On the side surface 10, the flank face 11 is closer to the rake face 2 side than the boundary line 14. In addition, on the side surface 10, the connection surface 15 is located closer to the seating surface 3 side than the boundary line 14.

The flank face 11 is partitioned into a first region 11A connected to the main cutting edge 21, a second region 11B connected to the subsidiary cutting edge 22, and a third region 11C connected to the corner cutting edge 23. The first region 11A, the second region 11B, and the third region 11C are arranged side by side along the circumferential direction of the center line CO.

The boundary line 14 extends along the circumferential direction of the center line CO while being curved in the thickness direction on the side surface 10. The boundary line 14 includes a first section 14a extending along the main cutting edge 21, a second section 14b extending along the subsidiary cutting edge 22, and a third section 14c extending along the corner cutting edge 23.

On the side surface 10, the first section 14a partitions the connection surface 15 and the first region 11A of the flank face 11, the second section 14b partitions the connection surface 15 and the second region 11B, and the third section 14c partitions the connection surface 15 and the third region 11C. As shown in FIG. 3, the second section 14b is located closer to the rake face 2 side than the first section 14a. In addition, the third section 14c is located closer to the seating surface 3 side than the first section 14a. In the boundary line 14, the first section 14a extends along the main cutting edge 21, the second section 14b protrudes to the rake face 2 side, and the third section 14c protrudes to the seating surface 3 side. In this manner, all of these are gently connected to one another.

As shown in FIG. 7, the insert 1 is mounted on the tool main body 31 by fastening a clamp screw 38. When the insert 1 is mounted on the tool main body 31, the first region 11A of the flank face 11 and the seating surface 3 function as restriction portions which come into contact with an insert mounting seat 33. That is, the first region 11A of the flank face 11 and the seating surface 3 are pressed against the insert mounting seat 33 by fastening the clamp screw 38 so that the insert 1 is positioned.

The insert 1 according to the present embodiment has a shape having 4 corners. When the rotationally symmetrically located cutting edge portion 20 reaches a predetermined wear amount, the insert 1 is rotated 90° around the center line CO, and is mounted again on the tool main body 31 so that another cutting edge portion 20 faces a workpiece.

According to the insert 1 of the present embodiment, on the side surface 10, a portion of the flank face 11 located on the rake face 2 side functions as the restriction portion which comes into contact with the tool main body 31 (refer to FIG. 7). That is, the side surface 10 is restricted by the tool main body 31 at a position close to the cutting edge portion 20. In this manner, the insert 1 can be sufficiently and firmly restricted with respect to the cutting force applied to the cutting edge portion 20.

Figure 4A:
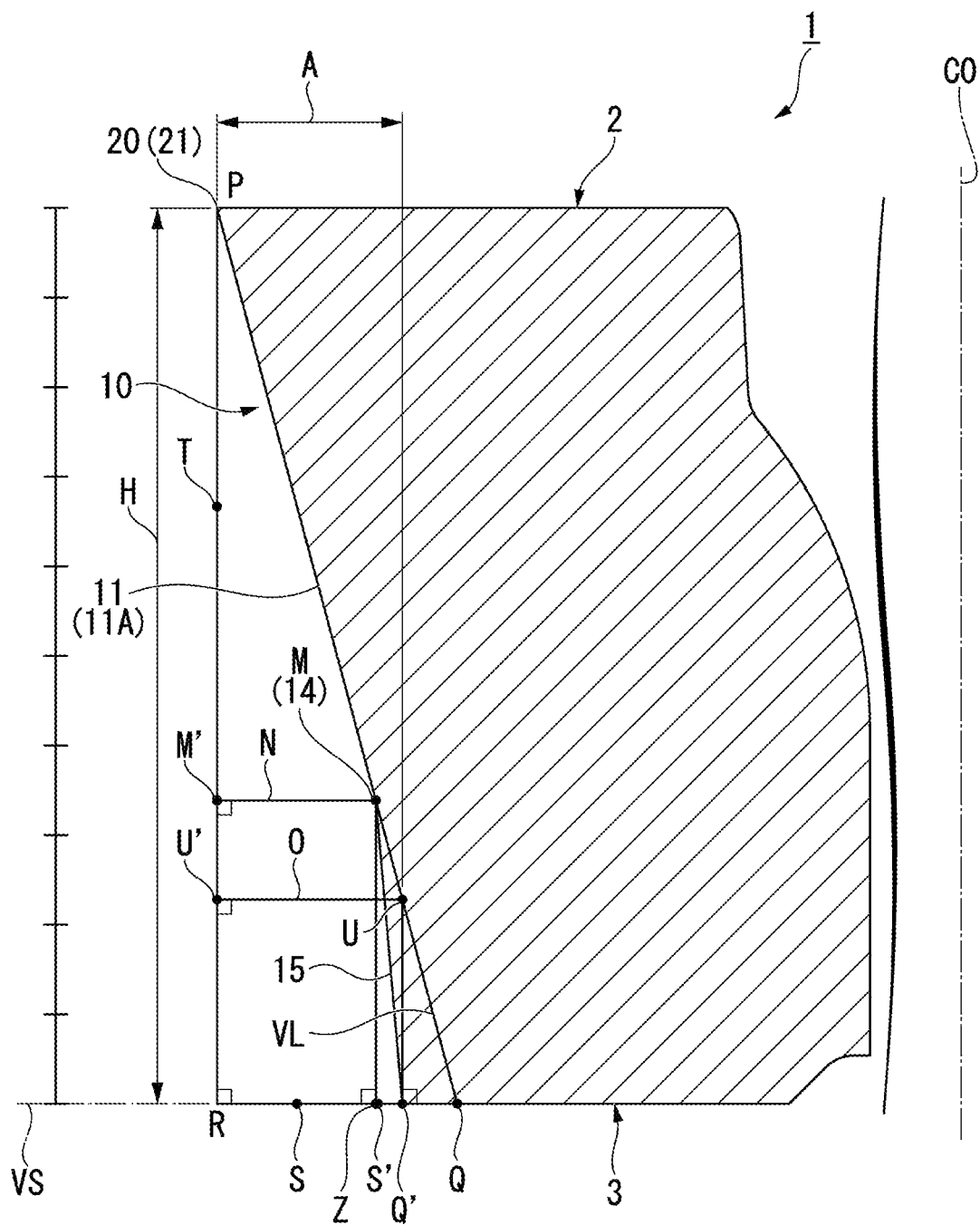
FIG. 4A is a sectional view of the insert taken along line IV-IV in FIG. 2, and is a sectional view in which a ridgeline of a main cutting edge of the insert and a normal line thereof intersect each other.
Figure 4B:
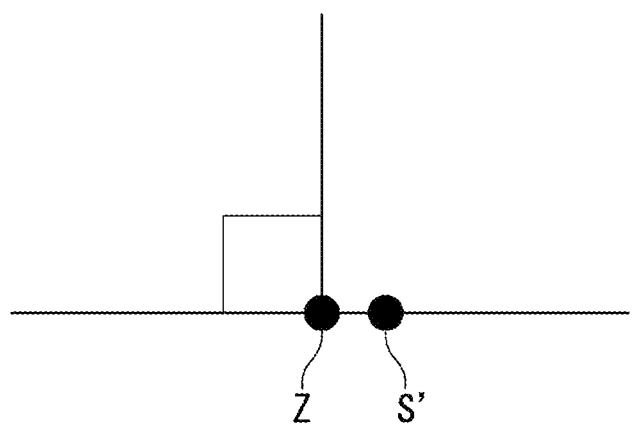
FIG. 4B is an enlarged view showing a position relationship between a point S' and a point Z in FIG. 4A.
Figure 5:
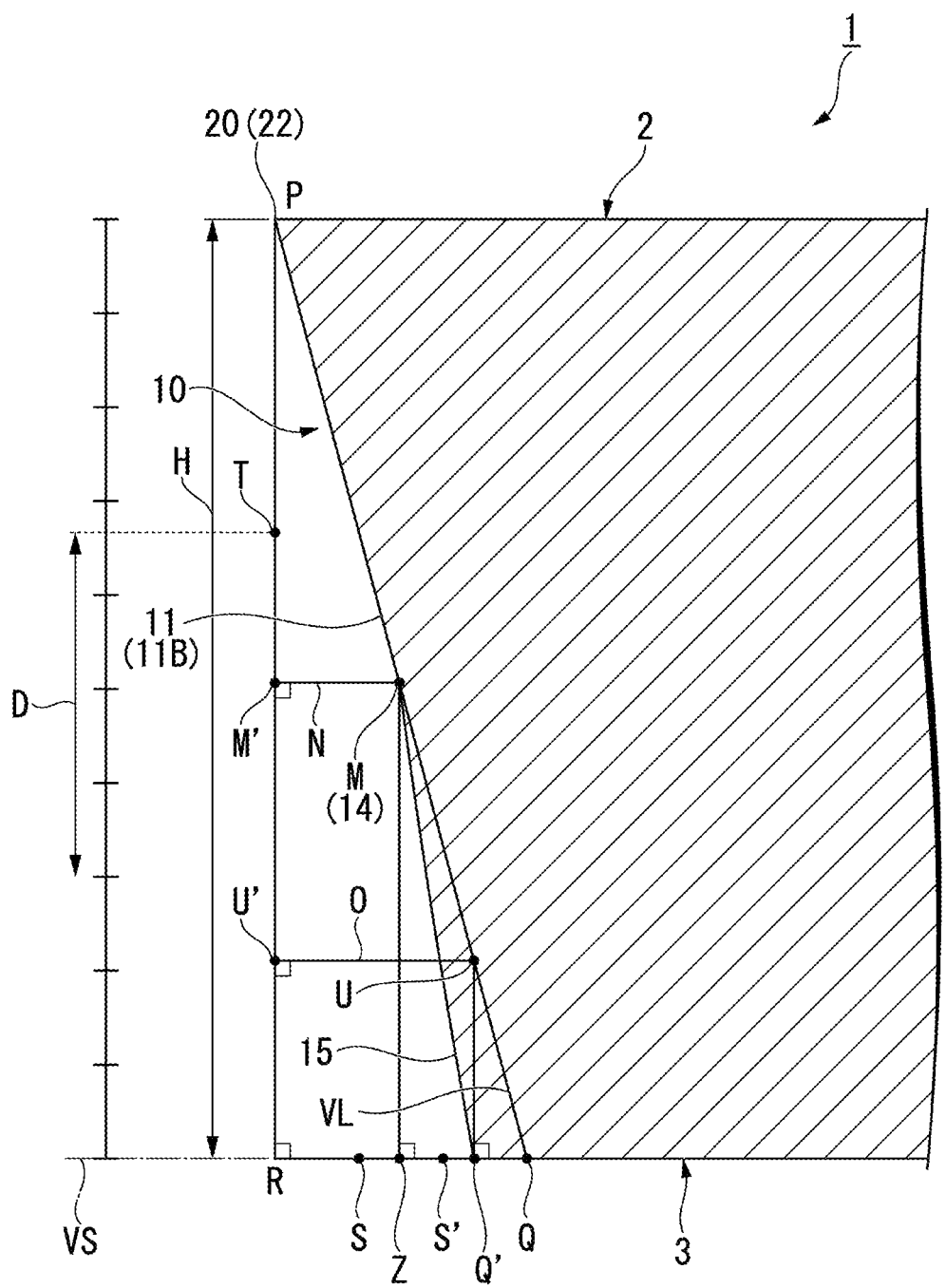
FIG. 5 is a sectional view of the insert taken along line V-V in FIG. 2, and is a sectional view in which a ridgeline of a subsidiary cutting edge of the insert and a normal line thereof intersect each other.
Figure 6:
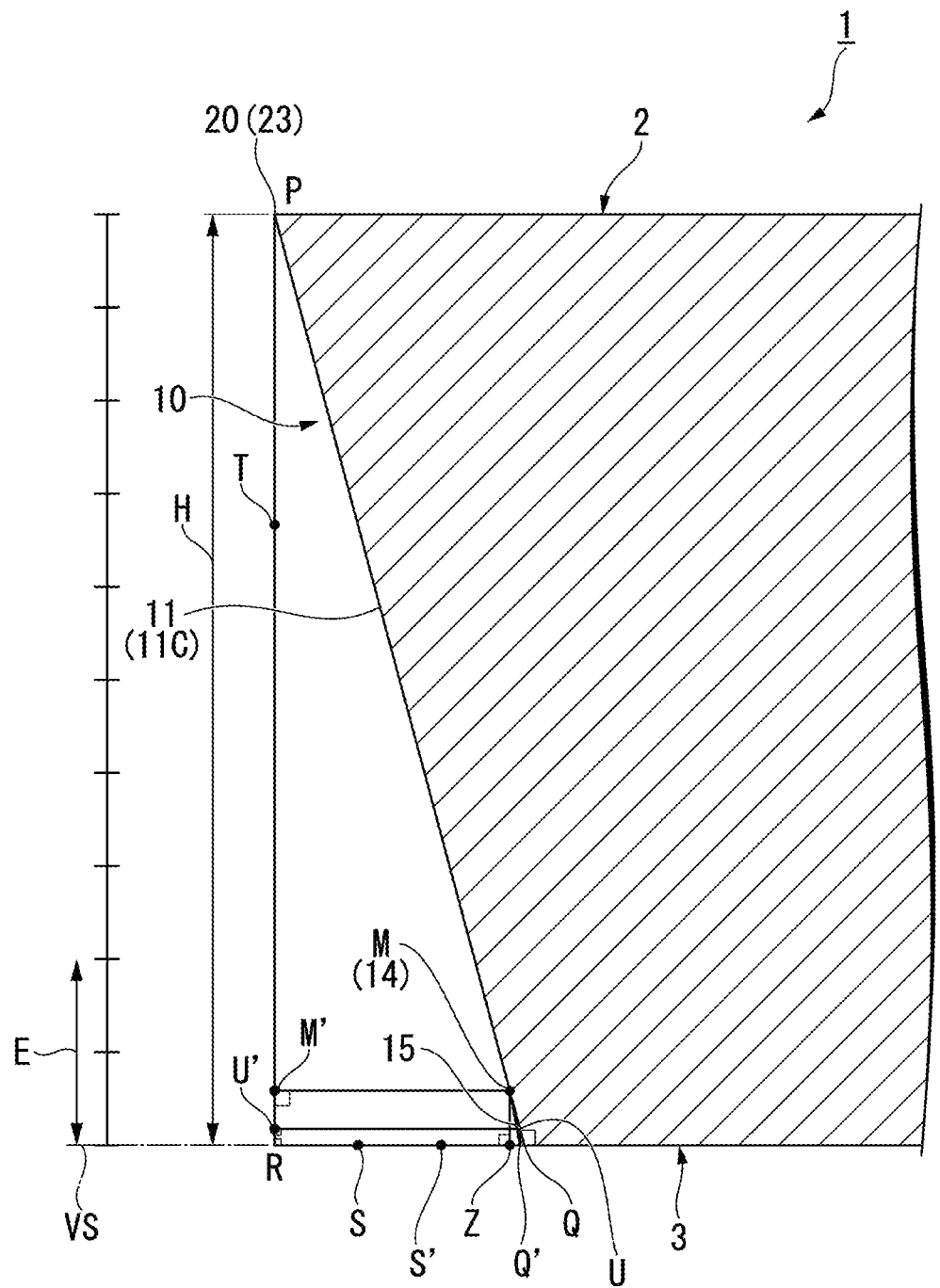
FIG. 6 is a sectional view of the insert taken along line VI-VI in FIG. 2, and is a sectional view in which a ridgeline of a corner cutting edge of the insert and a normal line of a tangential line thereof intersect each other.

FIG. 4A is a sectional view of the insert 1 taken along line IV-IV in FIG. 2. FIG. 5 is a sectional view of the insert 1 taken along line V-V in FIG. 2. FIG. 6 is a sectional view of the insert 1 taken along line VI-VI in FIG. 2. FIG. 4B is an enlarged view showing a position relationship between a point S' and a point Z in FIG. 4A.

In addition, line IV-IV intersects a cutting edge ridgeline as a normal line of the main cutting edge 21, line V-V intersects a cutting edge ridgeline as a normal line of the subsidiary cutting edge 22, and line VI-VI intersects a cutting edge ridgeline as a normal line of a tangential line of the corner cutting edge 23. Therefore, FIG. 4A is a sectional view in which the ridgeline of the main cutting edge 21 of the insert 1 and the normal line intersect each other. FIG. 5 is a sectional view in which the ridgeline of the subsidiary cutting edge 22 of the insert 1 and the normal line intersect each other. In addition, FIG. 6 is a sectional view in which the ridgeline of the corner cutting edge 23 of the insert 1 and the normal line of the tangential line intersect each other.

In a cross section in the normal direction of each cutting edge ridgeline shown in FIGS. 4A, 5, and 6, a point P, a point Q, a point Q', a point R, a point S, a point S', a point T, a point M, a point M', a point U, a point U', a line segment H, a line segment N, and a line segment O are defined as follows.

The point P is a passage point of the cutting edge portion 20.

The point Q is an intersection point between an extension line VS of the seating surface 3 along the flank face 11 and the seating surface 3.

The point Q' is a passage point of an intersection ridgeline between the connection surface 15 and the seating surface 3.

The point R is an intersection point between a perpendicular line extending from the point P toward the extension line VS of the seating surface 3 and the extension line VS of the seating surface 3.

The point S is a point located at a distance of ⅓ of the line segment QR from the point R.

The point S' is a point located at a distance of ⅔ of the line segment QR from the point R.

The line segment H is a line segment PR. That is, the line segment H is a line segment connecting the point P and the point R to each other. The point R can be differently defined as an intersection point between the line segment H and the extension line VS of the seating surface 3.

The point T is a point at a distance of ⅔ of the line segment H from the point R.

The point M is a passage point of the boundary line 14. That is, in a cross section in the normal direction of the cutting edge ridgeline, the point M is a boundary point between the flank face 11 and the connection surface 15.

The point M' is an intersection point between the perpendicular line extending from the point M toward the line segment H and the line segment H.

The line segment N is a line segment MM'. That is, the line segment N is a line segment connecting the point M and the point M' to each other. In other words, the point M' defined as an intersection point with the line segment H from the point M.

The point U is an intersection point between a perpendicular line of a line segment QR passing through the point Q' and a line segment PQ.

The point U' is an intersection point between the perpendicular line extending from the point U toward the line segment H and the line segment H.

The line segment O is a line segment UU'. That is, the line segment O is a line segment connecting the point U and the point U' to each other.

The point Z is an intersection point between the perpendicular line extending from the point M toward the extension line VS of the seating surface 3 and the extension line VS of the seating surface 3.

The cutting insert according to the present invention is a positive-type cutting insert. Accordingly, as shown in FIGS. 4A, 5, and 6, the flank face 11 and the connection surface 15 are inclined surfaces inclined along a substantial clearance angle.

Therefore, the side surface 10 is a positive-type surface inclined from the rake face 2 toward the seating surface 3, and an inclination angle of the side surface 10 is changed at the point M (that is, the boundary line 14). For example, as shown in FIG. 4A, if an angle MQR connecting the point M, the point Q, and the point R is similarly compared with an angle MQ'R, both are acute angles, and both have a relationship of angle MQR≤angle MQ'R. In other words, the connection surface 15 is located closer to a side having the point R than an extension line VL of the flank face 11, that is, outside the extension line VL of the flank face 11.

According to the insert 1 of the present embodiment, on the side surface 10, the connection surface 15 is formed on the seating surface 3 side. The connection surface 15 is located outside than the extension line VL of the flank face 11. That is, the connection surface 15 is formed on the side surface 10 so as to overlay the flank face 11 (build up a thickness of the flank face 11) on the seating surface 3 side.

In this manner, the rigidity of the insert 1 is improved, and damage to the insert 1 can be limited.

According to the insert 1 of the present embodiment, the connection surface 15 is provided. As a result, the area of the seating surface 3 increases. Therefore, the restriction stability of the insert 1 with respect to the tool main body can be improved.

According to the insert 1 of the present embodiment, the connection surface 15 is provided. Accordingly, a distance from the edge portion of the seating surface 3 to the cutting edge portion 20 (that is, a protrusion amount A, refer to FIGS. 2 and 4A) when viewed in the thickness direction can be shortened. As a result, the strength of the cutting edge portion 20 can be improved.

The insert 1 according to the present embodiment is the positive-type cutting insert. The flank face 11 and the connection surface 15 have a relationship of angle MQR≤angle MQ'R. Therefore, as shown in FIGS. 4A, 5, and 6, the point Q' does not further protrude to the point R side than the point Z. No portion under the thickness direction is formed on the side surface 10. That is, the insert 1 can be inexpensively manufactured using a simple mold configuration in which molds on a core side and a cavity side are respectively arranged on the rake face 2 side and the seating surface 3 side.

In addition, according to the present embodiment, a recess portion is not formed on the side surface 10. Therefore, compared to a case having the recess portion, it is possible to reduce a distance from a portion closest to the center line CO to the cutting edge portion 20 on the side surface 10. In the present specification, a distance in the radial direction from the portion closest to the center line CO to the cutting edge portion 20 on the side surface 10 is called a substantial protrusion amount. In the present embodiment, the substantial protrusion amount coincides with the protrusion amount A (distance in the radial direction from the edge portion of the seating surface 3 to the cutting edge portion 20). In addition, in a case where the recess portion is formed on the side surface 10, the substantial protrusion amount has a value which is greater than that of the protrusion amount A. According to the present embodiment, the substantial protrusion amount can be reduced by causing the substantial protrusion amount to coincide with the protrusion amount A. Therefore, the strength of the cutting edge portion 20 can be improved.

As shown in FIGS. 4A, 5, and 6, it is preferable that the point M' is located closer to the point R side than the point T which is a point located at a distance of ⅔ of the line segment H from the point R. In this manner, the length of the flank face 11 in the thickness direction can be secured to be longer than ⅓ of the length of the side surface 10 in the thickness direction (corresponding to the length of the line segment H).

That is, the area of the flank face 11 as the restriction portion restricted by the tool main body 31 is sufficiently secured on the side surface 10. Accordingly, the restriction stability of the insert 1 with respect to the tool main body 31 can be improved.

In a sectional view where the ridgeline of the main cutting edge 21 of the insert 1 and the normal line intersect each other, the point M' may be located closer to the point P side than 3/10 of the line segment H from the point R. In a cross section intersecting the main cutting edge 21, it is preferable that the point M' is located closer to the point P side than 3/10 of the line segment H from the point R and is located closer to the point R side than 5/10 of the line segment H from the point R. However, the configuration is not limited thereto.

The point Q' is located closer to the point Q side than the point S which is a point located at a distance of ⅓ of the line segment QR from the point R. In the present embodiment, the connection surface 15 is the inclined surface along the positive-type clearance angle. Accordingly, the point Q' is not located closer to the point R side than the point S. In addition, it is preferable that the point Q' is located closer to the point Q side than the point S' which is a point located at a distance of ⅔ of the line segment QR from the point R. The reason is as follows. While the area of the seating surface is largely secured, the seating surface is fitted inside the rotation trajectory formed by the cutting edge ridgeline when mounted on the tool main body. In this regard, it is advantageous.

As shown in FIG. 5, in a sectional view where the ridgeline of the subsidiary cutting edge 22 of the insert 1 and the normal line intersect each other, it is preferable that the point M' is located closer to the point P side than 3/10 of the line segment H from the point R and is located closer to the point R side than the point T. That is, in a cross section intersecting the subsidiary cutting edge 22, it is preferable that the point M' is located in a range D shown in FIG. 5.

As described above, the region (second region 11B) connected to the subsidiary cutting edge 22 in the flank face 11 does not configure the restriction portion. That is, the second region 11B does not come into contact with the tool main body 31. Therefore, in the second region 11B, the wideness of the flank face 11 does not contribute to the restriction stability of the insert 1.

In a cross section intersecting the subsidiary cutting edge 22, the point M' is located closer to the point P side than 3/10 of the line segment H from the point R (that is, the boundary line 14 is located close to the rake face side), and the wide connection surface 15 is formed. In this manner, the strength of the insert 1 can be improved by widening the connection surface 15. In addition, the point M' is located closer to the point R side than the point T. In this manner, the strength of the insert 1 can be maintained by securing the area of the connection surface 15.

In a cross section intersecting the subsidiary cutting edge 22, it is more preferable that the point M' is located closer to the point P side than 4/10 of the line segment H from the point R, and is located closer to the point R side than ⅔ of the line segment H from the point R. However, the configuration is not limited thereto.

As shown in FIG. 6, in a cross section where the ridgeline of the corner cutting edge 23 of the insert 1 and the normal line of the tangential line intersect each other, it is preferable that the point M' is located closer to the point R side than 2/10 of the line segment H. That is, in a cross section intersecting the corner cutting edge 23, it is preferable that the point M' is located in a range E shown in FIG. 6. The reason is as follows. In a cross section intersecting the corner cutting edge 23, the point M' is located closer to the point R side than 2/10 of the line segment H from the point R. In this manner, the clearance angle of the corner cutting edge is secured to have a proper value. When mounted on the tool main body, the seating surface is fitted inside the rotation trajectory formed by the corner cutting edge ridgeline. In this regard, it is advantageous. In addition, the cutting edge strength of the corner cutting edge can be maintained.

Here, the corner cutting edge 23 is disposed corresponding to the corner portion of the rake face 2. The region (third region 11C) of the flank face 11 connected to the corner cutting edge 23 does not configure the restriction portion. However, it is necessary to sufficiently secure the length of the flank face 11 in the thickness direction.

In a cross section intersecting the corner cutting edge 23, it is more preferable that the point M' is located closer to the point R side than 1/10 of the line segment H. However, the configuration is not limited thereto.

According to the present embodiment, as described above, in a cross section intersecting the main cutting edge 21, the subsidiary cutting edge 22, and the corner cutting edge 23, the point M' is differently located. That is, on the side surface 10, the position of the boundary line 14 in the thickness direction varies in the portion along the main cutting edge 21 (first section 14a), the portion along the subsidiary cutting edge 22 (second section 14b), and the portion along the corner cutting edge 23 (third section 14c). In this manner, in each region of the side surface 10 corresponding to each cutting edge, the areas of the flank face 11 and the connection surface 15 can be arranged in a well-balanced manner.

(Configuration of Indexable Edge Rotary Cutting Tool)

Figure 8:
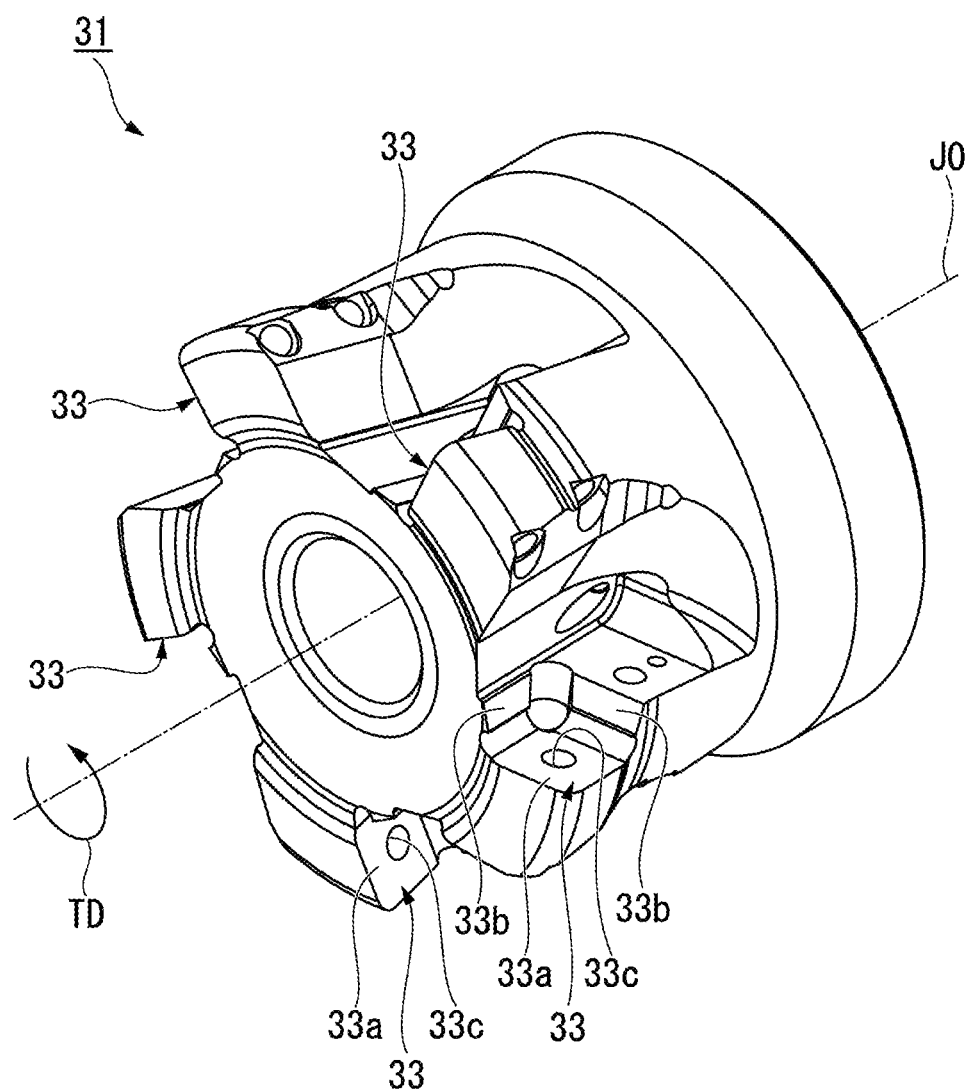
FIG. 8 is a perspective view of a tool main body according to the embodiment.

FIG. 7 is a perspective view of an indexable edge rotary cutting tool (hereinafter, simply referred to as a tool) 30 having a plurality of the inserts 1 and a tool main body 31 on which each of the inserts 1 is detachably mounted. FIG. 8 is a perspective view of the tool main body 31. In addition, FIG. 7 is a side view of the tool 30, and FIG. 8 is a bottom view of the tool 30.

The tool 30 carries out milling work by rotating the tool main body 31 in the rotation direction TD around a rotation axis JO. As shown in FIG. 7, the tool 30 has the tool main body 31 rotating around the tool and five inserts 1 to be respectively mounted on the tool main bodies 31.

As shown in FIG. 8, the tip portion of the tool main body 31 has five insert mounting seats 33. The insert mounting seat 33 has a mounting seat bottom surface 33a formed in a square shape having an area approximately equal to that of the seating surface 3 of the insert 1 and facing in the rotation direction TD, and a pair of mounting seat wall surfaces 33b respectively extending in the rotation direction TD from two sides of the mounting seat bottom surface 33a. A screw hole 33c is formed in substantially the center of the mounting seat bottom surface 33a.

The mounting seat bottom surface 33a faces and comes into contact with the seating surface 3 of the insert 1. In addition, the mounting seat wall surface 33b faces and comes into contact with the side surface 10 formed on the four sides of the insert 1. That is, the insert mounting seat 33

(the mounting seat bottom surface 33a and the mounting seat wall surface 33b) comes into contact with the restriction portion (the seating surface 3 and the flank face 11) of the insert 1.

The clamp screw 38 is fastened to the screw hole 33c via the insert 1. In this manner, the insert 1 is mounted on the insert mounting seat 33. In addition, the tool 30 has a clamp piece 34 which holds the rake face 2 side of the insert 1. The clamp piece 34 limits rising of the insert 1 during the cutting work.

In the insert 1 according to the present embodiment, the seating surface 3 is caused to closely adhere to the mounting seat bottom surface 33a of the tool main body 31, and the two flank faces 11 adjacent to each other in the circumferential direction are caused to closely adhere to each other by being brought into contact with the mounting seat wall surface 33b. Furthermore, the clamp screw 38 is inserted into the screw hole 33c. In this manner, the seating surface 3 and the flank face 11 are pressed against the mounting seat bottom surface 33a and the mounting seat wall surface 33b.

Figure 9:
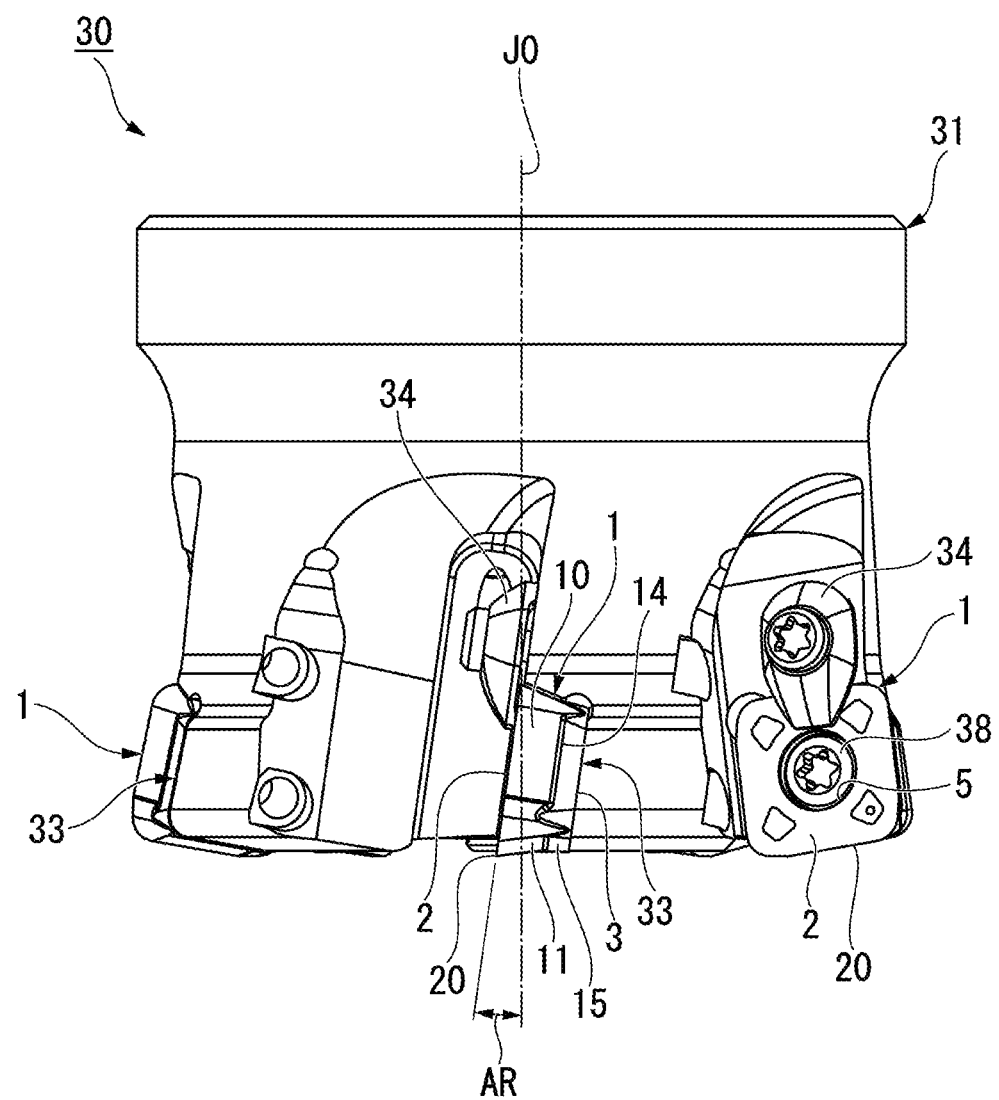
FIG. 9 is a side view of the indexable edge rotary cutting tool according to the embodiment.
Figure 10:
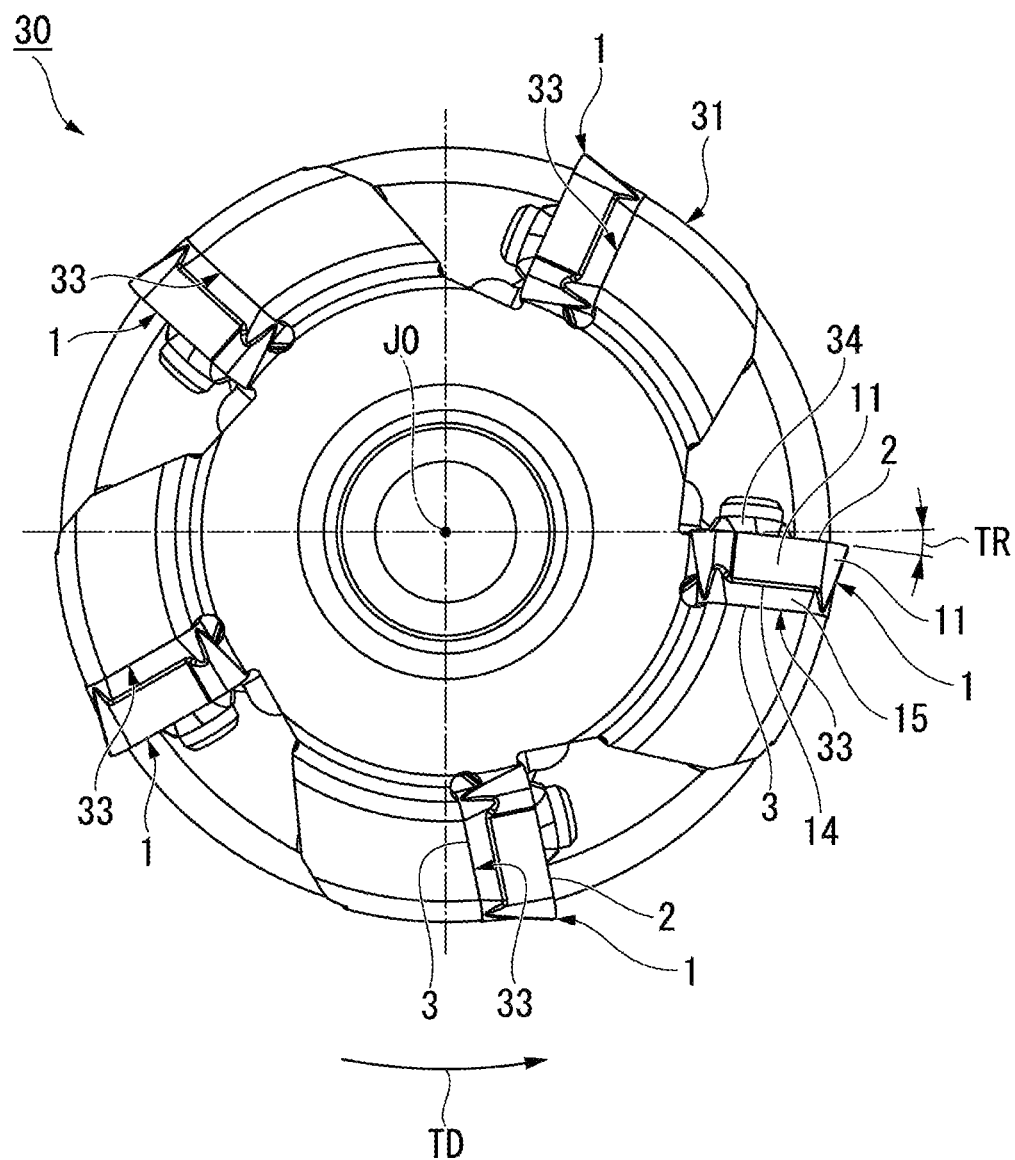
FIG. 10 is a bottom view of the indexable edge rotary cutting tool according to the embodiment.

As shown in FIG. 9, in a state where the insert 1 is mounted on the tool main body 31, the cutting edge portion 20 of the insert 1 is provided with a positive axial rake angle (axial rake angle) AR. In addition, as shown in FIG. 10, in a state where the insert 1 is mounted on the tool main body 31, the cutting edge portion 20 of the insert 1 is provided with a negative radial rake angle (radial rake angle) TR.

According to the present embodiment, the insert 1 is mounted on the tool main body 31 so that the radial rake angle TR of the cutting edge portion 20 is a negative angle. Therefore, it is necessary to secure the flank face 11 to be sufficiently long. In this state, even in a case where the insert 1 is mounted on the tool main body 31, the insert 1 adopts the above-described configuration of the boundary line 14. In this manner, the area of the flank face 11 in the thickness direction can be sufficiently secured. That is, other portions of the insert 1 can be reliably located inside the rotation trajectory of the cutting edge portion 20, and the cutting work can be smoothly carried out.

Hitherto, the embodiments according to the present invention have been described. However, the respective configurations and a combination thereof in the embodiments are merely examples. Additions, omissions, substitutions, and other modifications in the configuration are available within the scope not departing from the gist of the present invention. In addition, the present invention is not limited by the embodiments.

INDUSTRIAL APPLICABILITY

According to the present invention, it is possible to provide a cutting insert in which restriction stability of the cutting insert mounted on a tool main body is improved and strength is improved, and an indexable edge rotary cutting tool including the cutting insert. In this manner, even in a case where a strong force is applied to the cutting insert, cutting work can be stably carried out. In addition, damage to the cutting insert can be limited.

REFERENCE SIGNS LIST

1: insert (cutting insert)
2: rake face
3: seating surface
10: side surface
11: flank face
11A: first region connected to main cutting edge 21 in flank face 11
11B: second region connected to subsidiary cutting edge 22 in flank face 11
11C: third region connected to corner cutting edge 23 in flank face 11
14: boundary line
14a: first section
14b: second section
14c: third section
15: connection surface
20: cutting edge portion
21: main cutting edge
22: subsidiary cutting edge
23: corner cutting edge
30: tool (indexable edge rotary cutting tool)
31: tool main body
33: insert mounting seat
CO: center line
JO: rotation axis
S: point located at distance of ⅓ of line segment QR from point R
S': point located at distance of ⅔ of line segment QR from point R
T: point located at distance of ⅔ of line segment H from point R

What is claimed is:

1. A positive-type cutting insert mountable on a tool main body rotating around a rotation axis, and having a polygonal plate shape which is rotationally symmetric with respect to a center line extending in a thickness direction, the cutting insert comprising:
a rake face configuring one of a pair of polygonal surfaces;
a seating surface configuring the other one of the pair of polygonal surfaces; and
a side surface connecting the rake face and the seating surface to each other,
wherein an intersection ridgeline between the rake face and the side surface has a cutting edge portion including a main cutting edge located in a side portion of the rake face, a subsidiary cutting edge connected to the main cutting edge, and a corner cutting edge connected to the subsidiary cutting edge and located in a corner portion of the rake face,
wherein the main cutting edge extends linearly in a plan view and a side view of the cutting insert,
the subsidiary cutting edge is located between the main cutting edge and the corner cutting edge, and is continuously connected to the main cutting edge and the corner cutting edge,
wherein the side surface includes a flank face and a connection surface which are adjacent to each other in the thickness direction via a boundary line,
wherein the flank face is located closer to a rake face side than the boundary line,
wherein the connection surface is located closer to a seating surface side than the boundary line, and is located outside an extension line of the flank face,
the flank face is an inclined surface having an acute angle of inclination with respect to the rake surface,
the seating surface and a portion of the flank face which is connected to the main cutting edge function as restriction portions in contact with the tool main body, and the connection surface increases an area of the seating surface by being located outside an extension line of the flank face.

2. The cutting insert according to claim 1,
wherein the boundary line includes a first section extending along the main cutting edge, a second section extending along the subsidiary cutting edge, and a third section extending along the corner cutting edge,
wherein the second section is located closer to the rake face side than the first section, and
wherein the third section is located closer to the seating surface side than the first section.

3. An indexable edge rotary cutting tool comprising:
the cutting insert according to claim 2; and
the tool main body having the cutting insert detachably mounted thereon and rotating around the rotation axis,
wherein the tool main body has an insert mounting seat in contact with the flank face and the seating surface of the cutting insert.

4. The indexable edge rotary cutting tool according to claim 3,
wherein the cutting insert is mounted on the tool main body so that a rake angle of the cutting edge portion in a radial direction is a negative angle.

5. A tool main body rotating around a rotation axis, the tool main body comprising:
a tip portion of the tool main body is provided with an insert mounting seat, and
a cutting insert having a cutting edge portion is detachably mounted,
the cutting insert according to claim 2 is used as the cutting insert.

6. An indexable edge rotary cutting tool comprising:
the cutting insert according to claim 1; and
the tool main body having the cutting insert detachably mounted thereon and rotating around the rotation axis,
wherein the tool main body has an insert mounting seat in contact with the flank face and the seating surface of the cutting insert.

7. The indexable edge rotary cutting tool according to claim 6,
wherein the cutting insert is mounted on the tool main body so that a rake angle of the cutting edge portion in a radial direction is a negative angle.

8. The indexable edge rotary cutting tool according to claim 7,
wherein the insert mounting seat includes a mounting seat bottom surface facing in a rotation direction of the tool main, and a mounting seat wall surface extending from the mounting seat bottom surface in the rotation direction of the tool body,
the mounting seat bottom surface comes in contact with the seating surface,
the mounting seat wall surface comes in contact with the flank face, and
the cutting insert is mounted on the tool main body with the mounting seat bottom surface and the mounting seat wall surface pressed against the seating surface and the flank face.

9. The indexable edge rotary cutting tool according to claim 6,
wherein the insert mounting seat includes a mounting seat bottom surface facing in a rotation direction of the tool main, and a mounting seat wall surface extending from the mounting seat bottom surface in the rotation direction of the tool body,
the mounting seat bottom surface comes in contact with the seating surface,
the mounting seat wall surface comes in contact with the flank face, and
the cutting insert is mounted on the tool main body with the mounting seat bottom surface and the mounting seat wall surface pressed against the seating surface and the flank face.

10. A tool main body rotating around a rotation axis, the tool main body comprising:
a tip portion of the tool main body is provided with an insert mounting seat, and
a cutting insert having a cutting edge portion is detachably mounted,
the cutting insert according to claim 1 is used as the cutting insert.

11. The cutting insert according to claim 1, wherein in a cross section in a normal direction of each ridgeline of the main cutting edge, the subsidiary cutting edge, and the corner cutting edge,
a passage point of the cutting edge portion is set as a point P,
a perpendicular line extending from the point P toward an extension line of the seating surface is set as a line segment H,
an intersection point between the line segment H and the extension line of the seating surface is set as a point R,
an intersection point between an extension line along the flank face and the seating surface is set as a point Q,
a passage point of an intersection ridgeline between the connection surface and the seating surface is set as a point Q',
a passage point of the boundary line is set as a point M,
a perpendicular line extending from the point M toward the line segment H is set as a line segment N,
an intersection point between the line segment N and the line segment H is set as a point M',
the point Q' is located closer to a point Q side than a point S located at a distance of ⅓ of a line segment QR from the point R, and
the point M' is located closer to a point R side than a point T located at a distance of ⅔ of the line segment H from the point R.

12. The cutting insert according to claim 11,
wherein the point Q' is located closer to the point Q side than a point S' located at a distance of ⅔ of the line segment QR from the point R.

13. The cutting insert according to claim 12,
wherein in a cross section where a ridgeline of the subsidiary cutting edge and a normal line thereof intersect each other,
the point M' is located closer to the point P side than 3/10 of the line segment H from the point R, and
the point M' is located closer to the point R side than the point T.

14. The cutting insert according to claim 12,
wherein in a cross section where a ridgeline of the corner cutting edge and a normal line of a tangential line thereof intersect each other, and
the point M' is located closer to the point R side than 2/10 of the line segment H.

15. An indexable edge rotary cutting tool comprising:
the cutting insert according to claim 12; and
the tool main body having the cutting insert detachably mounted thereon and rotating around the rotation axis, wherein the tool main body has an insert mounting seat in contact with the flank face and the seating surface of the cutting insert.

16. A tool main body rotating around a rotation axis, the tool main body comprising:
a tip portion of the tool main body is provided with an insert mounting seat, and
a cutting insert having a cutting edge portion is detachably mounted,
the cutting insert according to claim 12 is used as the cutting insert.

17. The cutting insert according to claim 11,
wherein in a cross section where a ridgeline of the subsidiary cutting edge and a normal line thereof intersect each other,
the point M' is located closer to the point P side than $3/10$ of the line segment H from the point R, and
the point M' is located closer to the point R side than the point T.

18. The cutting insert according to claim 17,
wherein in a cross section where a ridgeline of the corner cutting edge and a normal line of a tangential line thereof intersect each other, and
the point M' is located closer to the point R side than $2/10$ of the line segment H.

19. A tool main body rotating around a rotation axis, the tool main body comprising:
a tip portion of the tool main body is provided with an insert mounting seat, and
a cutting insert having a cutting edge portion is detachably mounted,
the cutting insert according to claim 17 is used as the cutting insert.

20. The cutting insert according to claim 11,
wherein in a cross section where a ridgeline of the corner cutting edge and a normal line of a tangential line thereof intersect each other, and
the point M' is located closer to the point R side than $2/10$ of the line segment H.

21. A tool main body rotating around a rotation axis, the tool main body comprising:
a tip portion of the tool main body is provided with an insert mounting seat, and
a cutting insert having a cutting edge portion is detachably mounted,
the cutting insert according to claim 20 is used as the cutting insert.

* * * * *